United States Patent
Lipp

(10) Patent No.: US 6,685,981 B1
(45) Date of Patent: Feb. 3, 2004

(54) DEVICE AND PROCESS FOR MANUFACTURING CANDY

(75) Inventor: Eberhard Lipp, Altrip (DE)

(73) Assignee: Lipp Mischtechnik GmbH, Mannheim (DE)

( * ) Notice: Subject to any disclaimer, the term of this patent is extended or adjusted under 35 U.S.C. 154(b) by 66 days.

(21) Appl. No.: 09/677,360

(22) Filed: Oct. 2, 2000

(30) Foreign Application Priority Data

Oct. 26, 1999 (DE) .......................... 199 51 462

(51) Int. Cl.⁷ .............................. A23G 3/04; A23P 1/00
(52) U.S. Cl. ...................... 426/660; 426/456; 426/519; 426/520; 366/144
(58) Field of Search ................. 426/660, 456, 426/519, 520; 425/9; 366/144; 127/34

(56) References Cited

U.S. PATENT DOCUMENTS

| | | | | |
|---|---|---|---|---|
| 3,635,735 A | * | 1/1972 | Patil ........................... | 99/135 |
| 4,056,640 A | * | 11/1977 | Otto ........................... | 426/573 |
| 4,470,998 A | * | 9/1984 | Paget ........................... | 426/492 |
| 5,976,581 A | * | 11/1999 | Song et al. .................... | 426/3 |
| 6,582,753 B1 | * | 6/2003 | Willibald-Ettle et al. ... | 426/660 |

FOREIGN PATENT DOCUMENTS

| DE | 4313149 A1 | * | 10/1994 |
|---|---|---|---|
| SU | 457454 A | * | 3/1975 |

* cited by examiner

Primary Examiner—Drew Becker
(74) Attorney, Agent, or Firm—Harrison & Egbert

(57) ABSTRACT

The invention involves a process and a device for manufacturing a raw liquid confection mixture, whereby sugar containing dry components and liquid components are supplied from out of a dosing device into a mixing device. The mixing device involves a shearing mixer in which the components are stirred intensively by a rotor so that they liquefy due to the frictional heat that results in the process. In the process, only a very small water content is necessary such that dissolving the sugar-containing dry components in water, followed by the subsequent drawing off of water, as was the customary practice until now, is rendered unnecessary.

6 Claims, 1 Drawing Sheet

DEVICE AND PROCESS FOR MANUFACTURING CANDY

BACKGROUND OF THE INVENTION

1. Field of the Invention

The present invention relates a device for manufacturing raw liquid confection mixtures, which has at least one dosing device for supplying sugar-containing dry components and liquid components, as well as a mixing device.

2. Description of Related Art

The manufacture of raw confection mixtures for hard candy, caramel toffee candies, and soft caramel is generally done in so-called boiling systems, which consist of dissolving and mixing devices with a subsequently connected evaporator system.

In these types of systems, a dry component containing sugar is dissolved in water, where other components then can also be added to this solution in a mixing device. The other components can be, for example, glucose, milk modifications, starch and other hydrocolloids.

In a mixture of this type, the water is then drawn off again in evaporator devices, where the temperature of the condensed mixture must remain so high that the sugar is still dissolved even when the water content has been reduced and that the sugar is not crystallizing out. The temperature must be maintained so as to prevent any undesired crystallization in the subsequent cooling off and shaping of the candy.

The process described up to this point requires expensive vaporization systems, so that the vaporization of these types of mixtures containing sugar is very problematic, since sugar and possibly other additives such as starch, milk proteins, etc., can adhere over time to the heat-transferring surfaces in the vaporization system, which considerably impairs the transfer of heat.

In addition, this vaporization system then leads to the danger of overheating, so that the sugar is possibly caramelized and forms hard coatings, which can then only be removed at considerable expense. Also, in the process, the raw confection mixture can also become damaged, particularly in its taste, due to the temperatures that are too high.

The purpose of the invention presented here is thus to present a device and a process for manufacturing raw liquid confection mixtures, in which the described set of problems does not occur.

BRIEF SUMMARY OF THE INVENTION

The purpose is achieved according to the invention in that in a device such as the one indicated above, the mixing device provided is a shearing mixer, in which the components are stirred intensively by a rotor, so that they then are liquefied because of the frictional heat that results.

The invention is based on the discovery that in the process that has been applied until now, the liquid is also needed for the most part in order to be able to cause a heat transfer to the individual parts of the dry components. A sugar that has only a little water mixed in it is thus, for example, only slightly moistened, but the water cannot guarantee a heat transfer to individual sugar crystals. By using a shearing mixer, by comparison, the friction is generated directly on the'sugar crystal and the frictional heat that occurs there then leads directly to a liquefication of the sugar crystal.

The invention thus has the advantage that it is no longer necessary to add, to the dry components containing sugar, a lot of water that must later be evaporated again at great expense. Thus, on the one hand, the high-energy expense for the water evaporation is rendered unnecessary. In addition, the problems described above within the evaporator systems no longer occur. The manufacture of raw liquid confection mixtures is thus possible in a simpler and more cost-effective way.

For the shearing mixer, a construction that has proven to be especially favorable is one having a housing in which the rotor is provided. This rotor is then equipped with mixing blades that guide the components present in the shearing mixer in the axial direction, whereby the blades mesh with prong elements in a comb-like manner to form milling fissures at their outer radial ends. The prong elements are arranged in a ring-shaped manner on the inner wall of the housing projecting radially to the inside. A shearing mixer of this type is described, for example, in the German patent DE-PS 43 13 149.

A shearing mixer of this type can then also have dried and liquid components flowing through it continuously, such that it then advantageously has a component feeder zone in a region that is in the front in the flow direction and an outlet in a rear region in the flow direction. The rotor is then provided in the intermediate area.

For the dry components, a pre-mixer which sufficiently homogenizes the dried components can be connected in front of the shearing mixer.

In order to keep the components present in the shearing mixer at the necessary temperature, a special regulation device is provided. This device regulates the rotational speed of the rotor as a function of the temperature in the shearing mixer. When the temperature is dropping, the rotational speed is increased, and thus additional frictional heat or shearing energy is supplied to the components, so that the temperature increases again. When the temperatures are correspondingly too high, the rotational speed of the rotor is decreased.

It has proven to be favorable to connect a centrifugal pump wheel after the rotor, so that a pressure increase that promotes the conveyance of the raw liquid confection mixture is achieved.

In addition, it is also proposed to connect an intermediate container, in which a partial vacuum is admitted, after the shearing mixer. The partial vacuum that is prevalent here can evaporate water that is still contained in excess in the raw confection mixture evaporated using the heat that is stored in the raw confection mixture. The raw confection mixture can then be further processed in an exactly desired consistency.

The process described here is also especially suitable for reprocessing rejected products. For this, merely that quantity of liquid is added back into the broken confection, which had evaporated out of the raw confection mixture during the final shaping of candies. Complete dissolving of the confection rejects in liquid, which was customary until now, thus becomes unnecessary.

In the manufacturing of fresh products, the device described here and the process that accompanies it also has the advantage that flavoring and coloring agents can be added directly in the single mixing operation, without the need to provide separate mixing operations and mixing devices for this. It should otherwise also be mentioned that it could also be sometimes sufficient to add to the solids only the liquid flavors and coloring agents, and the glucose portion that to a certain extent contains water, in order to ensure the water content for the finished raw confection mixture.

DETAILED DESCRIPTION OF THE INVENTION

Figure 1:
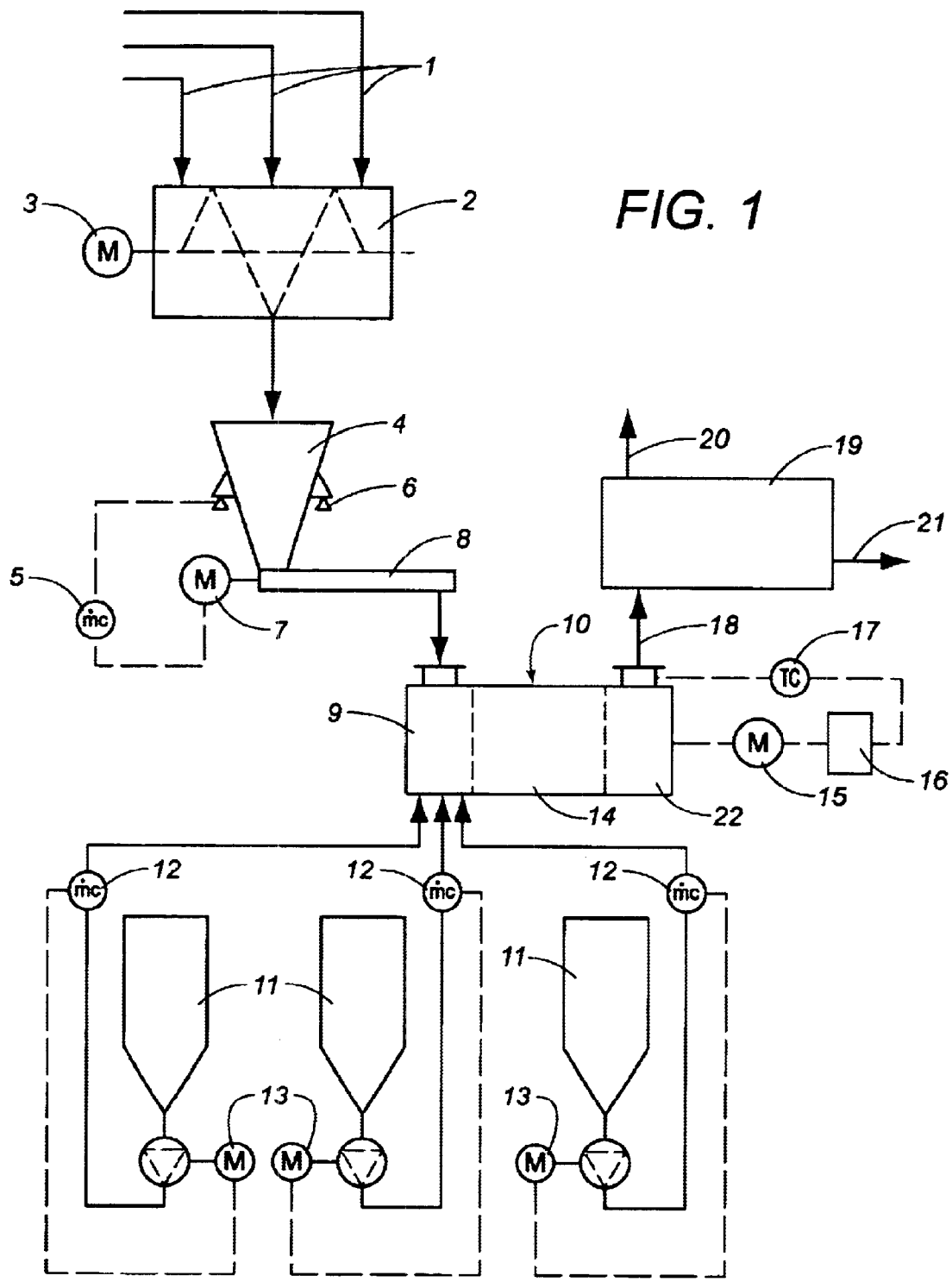
FIG. 1 is the schematic view of a device for producing raw liquid confection mixtures.

FIG. 1, a schematic diagram of a system for manufacturing raw liquid confection mixtures is shown.

Dry, solid, or powdered and sugar-containing components 1 are supplied to a pre-mixer 2, which is driven by a motor 3. The solid components that are pre-mixed and homogenized in this way are then put in the funnel 4 of a dosing device. In this dosing device, by a quantity control 5, which contains the weight data of load cells 6, a motor 7 is driven, which then puts the necessary quantity of solid components into a component feeder zone 9 of a shearing mixer 10 via a screw feeder 8. At the same time, liquid components are supplied to this component feeder zone 9 from tanks 11. These liquid components involve, for example, glucose with a relatively high water content (of up to approx. 20%), as well as coloring agents and flavors. Also, corresponding quantity controls 12, which act on the corresponding pump motors 13, regulate the liquid quantities that are guided in from out of the tanks 11 of the component feeder zone 9 of the shearing mixer 10.

In the component feeder zone 9, the solid components and the liquid components are mixed together and then fed to a rotor in a middle region 14 of the shearing mixer 10. The rotor transports the components in the axial direction in a manner not shown here, and in the process, with mixing blades that are located on it, meshes with prong elements in a comb-like manner. The prong elements are arranged in a ring shape on the inner wall of the housing and project radially to the inside. The milling fissures that are formed in the process, having a width of approximately one millimeter, make it so that the components that are pressed through them heat up because of friction, so that the sugar then liquefies because of its special property. The rotational speeds, with which the rotor can rotate in the process, can, depending on the requirement, be in the range between 600 and 3500 revolutions per minute.

The rotational speed of the rotor, which is driven by a motor 15, is regulated in the process by a control unit 16, which detects the temperature of the raw confection mixture emerging from out of the shearing mixer 10, as the conductance over a temperature-measuring sensor 17. When the temperature increases, the rotational speed of the motor 15 is reduced, and when the temperature decreases, the rotational speed of the motor 15 is increased. This rotational speed adjustment can be done continuously.

The melted mixture 18 emerging from out of the shearing mixer is also poured into an intermediate container 19, into which a partial vacuum is admitted. In this intermediate container, excess water 20 that is still remaining is drawn off of the melted mixture using the heat stored in the melted mixture. The remaining raw liquid confection mixture 21 can then be further processed in the known way.

It should be mentioned at this point that the device and the process described are also suitable for reprocessing confection rejects. To do this, these confection rejects are filled into the funnel 4 and fed in the manner described into the component feeder zone 9 of the shearing mixer 10 via the screw feeder 8.

As the liquid component out of the tanks 11, only water is added.

In the middle region 14 of the shearing mixer 10, the confection reject material is liquefied again and mixed, and it is then output as a melted mixture 18, possibly as a raw confection mixture via the intermediate container 19.

It should also be noticed that in the shearing mixer 10, a centrifugal pump wheel 22 can also be connected after the rotor. With the pump wheel, the melted mixture can be supplied to the subsequently connected elements at an additional pressure of up to 1 bar.

The device described and the process described have, in particular, the advantage that in the shearing mixer 10, only very little liquid must be supplied in order to achieve a sufficient liquefication of the raw confection mixture and this liquid thus does to not need to be removed, i.e. evaporated, at a high expense afterwards.

I claim:

1. A continuous process for manufacturing raw mixtures for candies comprising:
   supplying dry components containing sugar in crystal form and liquid components to a mixer;
   shear mixing said dry components and said liquid components in said mixer by intensively stirring with a rotor of said mixer; and
   melting said sugar in crystal form only by frictional heat from said step of shear mixing, said steps of supplying and shear mixing and melting occurring as a continuous process.

2. The process of claim 1, said step of shear mixing comprising:
   placing said dry and liquid components into a housing on said rotor;
   guiding said dry and liquid components by mixing blades in an axial direction; and
   pressing the guided components through milling fissures, said milling fissures being formed by stator elements at radial ends of said mixing blades, said mixing blades meshing in a comb-like manner, said mixing blades being arranged in a ring shape on a inner wall of said housing and projecting radially to an interior of said housing.

3. The process of claim 1, said dry components containing confection rejects.

4. The process of claim 1, said liquid components containing flavoring agents and coloring agents.

5. The process of claim 1, further comprising the step of:
   drawing off water contained in the mixed components passing from said mixer by a partial vacuum from heat stored in the mixed components.

6. The process of claim 1, said step of shear mixing comprising:
   rotating said rotor at a rate of between 600 and 3500 revolutions per minute.

* * * * *